(12) United States Patent
Kim et al.

(10) Patent No.: US 12,028,570 B2
(45) Date of Patent: *Jul. 2, 2024

(54) CONTROL DEVICE, BROADCAST RECEIVER, METHOD FOR CONTROLLING BROADCAST RECEIVER, AND METHOD FOR PROVIDING SERVICE

(71) Applicant: SAMSUNG ELECTRONICS CO., LTD., Suwon-si (KR)

(72) Inventors: Joo-youn Kim, Seoul (KR); Yong-hwan Kwon, Seongnam-si (KR); Jung-a Kim, Suwon-si (KR); Bum-jin Lee, Goyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/875,899

(22) Filed: Jul. 28, 2022

(65) Prior Publication Data

US 2022/0368975 A1 Nov. 17, 2022

Related U.S. Application Data

(63) Continuation of application No. 16/415,326, filed on May 17, 2019, now Pat. No. 11,451,851, which is a (Continued)

(30) Foreign Application Priority Data

Dec. 31, 2010 (KR) .................. 10-2010-0140242

(51) Int. Cl.
*H04N 21/41* (2011.01)
*G08C 17/02* (2006.01)
*H04N 21/482* (2011.01)

(52) U.S. Cl.
CPC ....... *H04N 21/41265* (2020.08); *G08C 17/02* (2013.01); *H04N 21/482* (2013.01); *G08C 2201/32* (2013.01)

(58) Field of Classification Search
CPC .... H04N 5/44; H04N 21/41; H04N 21/41265; H04N 21/482; H04N 5/445; H04N 5/45;
(Continued)

(56) References Cited

U.S. PATENT DOCUMENTS 6,255,961 B1 * 7/2001 Van Ryzin ....... H04N 21/42204
348/E5.103
6,567,984 B1 5/2003 Allport
(Continued)

FOREIGN PATENT DOCUMENTS

EP           2141675 A2   1/2010
KR   10-2010-0003512 A   1/2010
(Continued)

OTHER PUBLICATIONS

Communication dated Mar. 21, 2022 issued by the European Patent Office in counterpart European Application No. 20 198 642.9.
(Continued)

*Primary Examiner* — Trang U Tran
(74) *Attorney, Agent, or Firm* — Sughrue Mion, PLLC

(57) ABSTRACT

A method for controlling a control device includes receiving, from a broadcast receiver, first information regarding a content which is currently provided through the broadcast receiver, and displaying a UI corresponding to the content which is currently provided through the broadcast receiver among a plurality of UIs based on the received first information. The plurality of UIs includes a plurality of UI items for controlling the broadcast receiver, respectively. A control command is transmitted to the broadcast receiver in
(Continued)

response to a user input selecting an UI item among the plurality of UI items for controlling the broadcast receiver.

15 Claims, 8 Drawing Sheets

Related U.S. Application Data continuation of application No. 14/854,814, filed on Sep. 15, 2015, now Pat. No. 10,298,990, which is a continuation of application No. 13/290,198, filed on Nov. 7, 2011, now Pat. No. 9,723,350.

(58) Field of Classification Search
CPC ......... H04N 21/42207; H04N 21/4345; G08C 17/02; G08C 2201/32
USPC .................................. 725/44; 348/734, 725
See application file for complete search history.

(56) References Cited

U.S. PATENT DOCUMENTS

| | | | |
|---|---|---|---|
| 6,914,551 | B2 | 7/2005 | Vidal |
| 7,109,974 | B2 | 9/2006 | Kempisty |
| 7,174,518 | B2 | 2/2007 | Kim |
| 7,814,419 | B2 | 10/2010 | Fabritius |
| 8,054,294 | B2 | 11/2011 | Sakai et al. |
| 8,217,825 | B2 | 7/2012 | Kim et al. |
| 8,217,964 | B2 | 7/2012 | Laine et al. |
| 8,291,465 | B2 | 10/2012 | Sussman |
| 8,432,490 | B2 | 4/2013 | Lee |
| 8,863,184 | B2 | 10/2014 | Arling et al. |
| 8,896,672 | B2 * | 11/2014 | Lee ............... H04N 13/356 715/848 |
| 8,958,018 | B2 | 2/2015 | Sibilsky et al. |
| 9,329,746 | B2 | 5/2016 | Lee |
| 2006/0258289 | A1 | 11/2006 | Dua |
| 2009/0156251 | A1 | 6/2009 | Cannistraro et al. |
| 2009/0207184 | A1 | 8/2009 | Laine et al. |
| 2010/0001893 | A1 | 1/2010 | Kim et al. |
| 2010/0157167 | A1 | 6/2010 | Lawther et al. |
| 2010/0315563 | A1 | 12/2010 | Park |
| 2011/0134325 | A1 | 6/2011 | Ahn |
| 2014/0071345 | A1 | 3/2014 | Park |

FOREIGN PATENT DOCUMENTS

| | | |
|---|---|---|
| KR | 1020100135145 A | 12/2010 |
| WO | 2010016853 A1 | 2/2010 |

OTHER PUBLICATIONS

Communication dated Oct. 14, 2020, issued by the European Patent Office in counterpart European Application No. 20198642.9.
Communication dated Jul. 13, 2020, from the European Patent Office in counterpart European Application No. 20164405.1.
Communication dated May 25, 2013, issued by the European Patent Office in counterpart European Application No. 11188994.5.
Communication dated Jul. 1, 2016, issued by the Korean Intellectual Property Office in counterpart Korean Application No. 10-2010-0140242.
Communication, dated Aug. 27, 2013, issued by the European Patent Office in counterpart European Application No. 11188994.5.
Office Action received in U.S. Appl. No. 13/290,198 dated Mar. 15, 2013.
Office Action received in U.S. Appl. No. 13/290,198 dated Sep. 25, 2013.
Office Action received in U.S. Appl. No. 13/290,198 dated Jan. 31, 2014.
Office Action received in U.S. Appl. No. 13/290,198 dated Jul. 8, 2014.
Office Action received in U.S. Appl. No. 13/290,198 dated Jan. 16, 2015.
Office Action received in U.S. Appl. No. 13/290,198 dated Jul. 30, 2015.
Office Action received in U.S. Appl. No. 13/290,198 dated Nov. 6, 2015.
Office Action received in U.S. Appl. No. 13/290,198 dated May 6, 2016.
Office Action received in U.S. Appl. No. 13/290,198 dated Sep. 22, 2016.
Notice of Allowance received in U.S. Appl. No. 13/290,198 dated Mar. 23, 2017.
Office Action received in U.S. Appl. No. 14/854,814 dated Feb. 16, 2016.
Office Action received in U.S. Appl. No. 14/854,814 dated Jul. 28, 2016.
Office Action received in U.S. Appl. No. 14/854,814 dated Oct. 7, 2016.
Office Action received in U.S. Appl. No. 14/854,814 dated May 4, 2017.
Office Action received in U.S. Appl. No. 14/854,814 dated Sep. 8, 2017.
Office Action received in U.S. Appl. No. 14/854,814 dated Mar. 12, 2018.
Office Action received in U.S. Appl. No. 14/854,814 dated Jun. 29, 2018.
Notice of Allowance received in U.S. Appl. No. 14/854,814 dated Jan. 7, 2019.
Extended European Search Report dated Feb. 5, 2024 in European Application No. 20198642.9.

* cited by examiner

CONTROL DEVICE, BROADCAST RECEIVER, METHOD FOR CONTROLLING BROADCAST RECEIVER, AND METHOD FOR PROVIDING SERVICE

CROSS-REFERENCE TO RELATED APPLICATIONS

This is a continuation of U.S. application Ser. No. 16/415,326, filed May 17, 2019, which is a continuation of U.S. application Ser. No. 14/854,814 filed Sep. 15, 2015, now U.S. Pat. No. 10,298,990, issued May 21, 2019, which is a continuation of U.S. application Ser. No. 13/290,198 filed Nov. 7, 2011, now U.S. Pat. No. 9,723,350, issued Aug. 1, 2017, which claims priority from Korean Patent Application No. 10-2010-0140242, filed in the Korean Intellectual Property Office on Dec. 31, 2010, the disclosures of which are incorporated herein by reference in their entities.

BACKGROUND

1. Field

Aspects of the exemplary embodiments relate to a control device, a broadcast receiver, a method for controlling a broadcast receiver, and a method for providing a service, and more particularly, to a control device which allows a user to easily change a display menu of the control device according to a user's preference and circumstances, a broadcast receiver, a method for controlling a broadcast receiver, and a method for providing a service thereof.

2. Description of the Related Art

A broadcast receiver which receives digital and/or analog satellite broadcast, converts the digital satellite broadcast or analog satellite broadcast transmitted from a broadcast station, and displays the converted signal or transmits the converted signal to an external display apparatus. The broadcast receiver which also receives a video and/or an audio signal input from various external apparatuses such as a video player, a DVD player, and a Blu-ray disc player converts the signal into a transport stream (TS) signal, and displays the converted signal or transmits the converted signal to the external display apparatus. Such a broadcast receiver includes Internet Protocol Television (IPTV) such as a digital TV and Video On Demand (VOD) and a set-top box (STB).

Recently, a broadcast receiver is capable of providing various types of information using a menu and thus, a user is provided with various menus. In order to select a desired menu through a remote controller, a user needs to press a button on the remote controller corresponding to the desired menu and check an image medium formed on the receiver located at some distance from where the user is located to confirm that the desired menu is selected. This operation is inconvenient to the user since the user needs to perform the input operation in the remote controller while checking the image medium on the receiver which can be located some distance away from the user.

SUMMARY

An aspect of the exemplary embodiments relates to a control device which allows a user to easily select a device displaying a menu according to a user's preference and circumstances, a broadcast receiver, a method for controlling a broadcast receiver and a method for providing a service thereof.

A control device which controls a broadcast receiver, according to an exemplary embodiment, includes a communication interface unit which requests and receives menu information from the broadcast receiver, a determination unit which determines a control mode of the control device, a user interface unit which displays the received menu information and a user interface window according to the determined control mode, and a control unit which, if a command to control the broadcast receiver is input through the user interface unit, controls the communication interface unit to transmit the input control command to the broadcast receiver.

The control mode may include at least one of a first control mode in which only an area for receiving a command to control the broadcast receiver is displayed on the user interface window and a second control mode in which the received menu information is displayed on the user interface window.

The determination unit may control the user interface unit to display a user interface window for receiving at least one of the first control mode and the second control mode and determine a control mode through the displayed user interface window.

The determination unit may identify a grip direction of a user with respect to a control device using a gyro sensor and determine a control mode corresponding to the identified grip direction.

The determination unit, if the grip direction of a user is a vertical direction with respect to the user, may determine a control mode as a first control mode in which only an area for receiving a command to control the broadcast receiver is displayed on the user interface window, and if the grip direction of a user is a horizontal direction with respect to the user, may determine a control mode as a second control mode in which the received menu information is displayed on the user interface window.

The control unit, if a control mode is determined to be a first control mode, may control the user interface unit to display pre-stored user interface window corresponding to an operation mode of the broadcast receiver, and if a control mode is determined to be a second control mode, may control the user interface unit to display pre-stored user interface window corresponding to an operation mode of the broadcast receiver together with the received menu information.

The menu information may include at least one of channel information, current volume, play time, remaining play time, current time, Electronic Program Guide (EPG), and an operation mode of a broadcast receiver.

The control unit, if the control device is gripped in a horizontal direction with respect to a user, may control to display screen information being displayed on the broadcast receiver on the user interface unit.

A broadcast receiver, according to an exemplary embodiment, includes a determination unit which determines an apparatus where a menu for controlling the broadcast receiver is to be displayed, a display unit which displays menu information, a communication interface unit which transmits menu information to the control device and receives a control command from the control device, and a control unit which provides a service corresponding to the control command according to a control command received from the control device and controls the display unit not to display the menu information if it is determined that a menu is displayed on the control device.

The menu information may include at least one of channel information, current volume, play time, remaining play time, current time, Electronic Program Guide (EPG), an operation mode of a broadcast receiver, and screen information being displayed on the broadcast receiver.

A method for controlling a broadcast receiver of a control device, according to an exemplary embodiment, includes determining a control mode of a control device, requesting and receiving menu information from the broadcast receiver, displaying the received menu information and a user interface window according to the determined control mode, receiving a command to control the broadcast receiver, and transmitting the received control command to the broadcast receiver.

The control mode may include at least one of a first control mode in which only an area for receiving a command to control the broadcast receiver is displayed on the user interface window and a second control mode in which the received menu information is displayed on the user interface window.

The determining may include displaying a user interface window for receiving at least one of the first control mode and the second control mode and determining a control mode through the displayed user interface window.

The determining may include identifying a grip direction of a user with respect to a control device using a gyro sensor and determining a control mode corresponding to the identified grip direction.

The determining may include, if the grip direction of a user is a vertical direction with respect to the user, determining a control mode as a first control mode in which only an area for receiving a command to control the broadcast receiver is displayed on the user interface window, and if the grip direction of a user is a horizontal direction with respect to the user, determining a control mode as a second control mode in which the received menu information is displayed on the user interface window.

The displaying the user interface window may include, if a control mode is determined to be a first control mode, displaying pre-stored user interface window corresponding to an operation mode of the broadcast receiver, and if a control mode is determined to be a second control mode, displaying pre-stored user interface window corresponding to an operation mode of the broadcast receiver together with the received menu information.

The menu information may include at least one of channel information, current volume, play time, remaining play time, current time, Electronic Program Guide (EPG), and an operation mode of a broadcast receiver.

The method may further include, if the control device is gripped in a horizontal direction with respect to a user, displaying screen information being displayed on the broadcast receiver.

A method for providing a service of a broadcast receiver, according to an exemplary embodiment, includes determining an apparatus where a menu for controlling the broadcast receiver is to be displayed, if it is determined that a menu is displayed on the broadcast receiver, displaying the menu information, transmitting menu information to the control device, receiving a control command from the control device, and providing a service corresponding to the control command.

The menu information may include at least one of channel information, current volume, play time, remaining play time, current time, Electronic Program Guide (EPG), an operation mode of a broadcast receiver, and screen information being displayed on the broadcast receiver.

BRIEF DESCRIPTION OF THE DRAWINGS

The above and/or other aspects of the present disclosure will be more apparent by describing certain present disclosure with reference to the accompanying drawings, in which.

DETAILED DESCRIPTION

Figure 1:
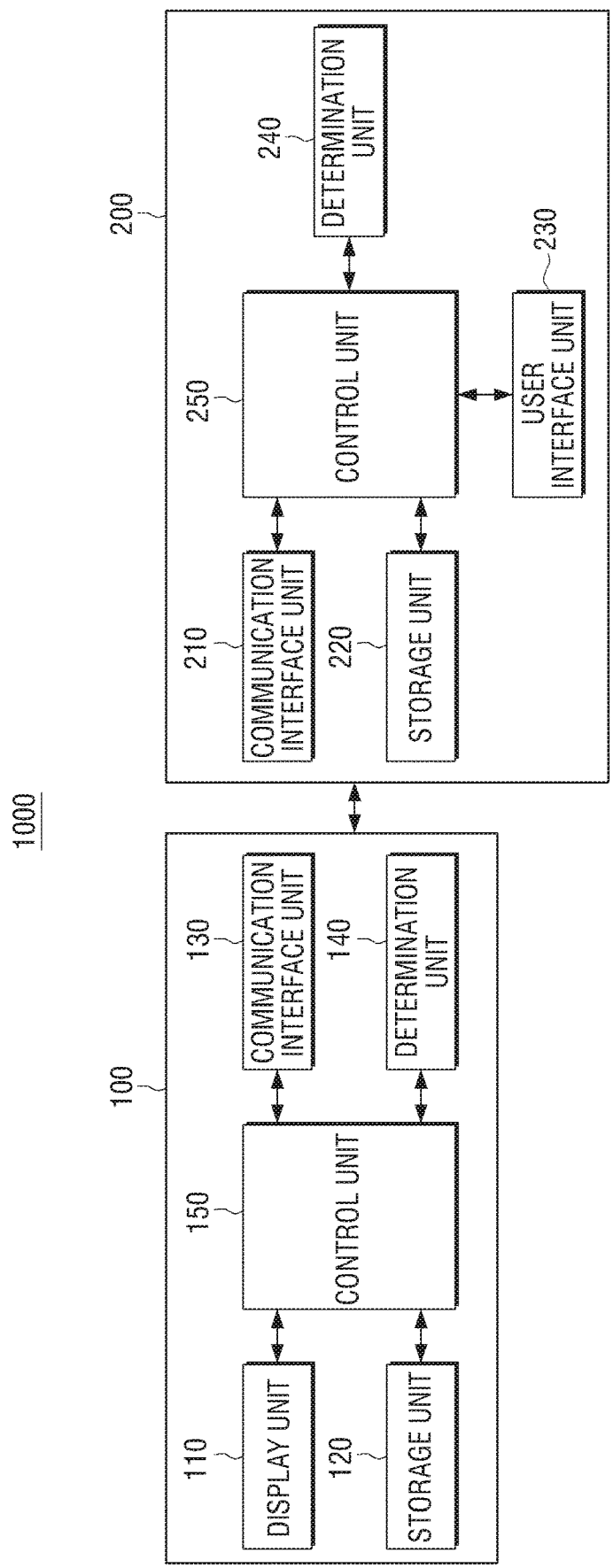
FIG. 1 is a block diagram illustrating a configuration of a home network system according to an exemplary embodiment.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a block diagram illustrating the configuration of a home network system according to an exemplary embodiment.

Referring to FIG. 1, the home network system 1000 includes a broadcast receiver 100 and a control device 200. The broadcast receiver 100 provides a user with an image or video/audio information, and may be embodied as a digital TV, STB, PC, notebook computer, personal media player (PMP), and so on. Specifically, the broadcast receiver 100 may include a display unit 110, a storage unit 120, a communication interface unit 130, a determination unit 140, and a control unit 150.

The display unit 110 may display information provided by the broadcast receiver 100. The display unit 110 may be an apparatus which is capable of receiving and outputting data such as a touch pad device, or may be an image display apparatus such as a liquid crystal display (LCD), plasma display panel (PDP) and cathode ray-tube (CRT). Furthermore, the control device 200 may receive a service screen provided by the broadcast receiver 100.

In addition, the display unit 110 of the broadcast receiver 100 may display a menu for selecting a service by a user. Specifically, if the determination unit 140 which will be explained later determines that a menu is displayed on the broadcast receiver 100, a menu for selecting a service by a user may be displayed. On the other hand, if the determination unit 140 determines that a menu is displayed only on the control device 200, the display unit 110 of the broadcast receiver 100 may not display a menu.

Meanwhile, if the broadcast receiver 100 is an apparatus such as a digital TV, the display unit 110 may be an internal component of the digital TV, and if the broadcast receiver 110 is a set-top box, the display unit 110 may be an external component or apparatus (such as a monitor or a TV connected to the set-top box).

The storage unit 120 may store contents corresponding to various services supported by the broadcast receiver 100. In addition, the storage unit 120 may store a plurality of user interface windows corresponding to an operation mode of the broadcast receiver 100. As such, the storage unit 120 may be embodied as a storage medium inside the broadcast receiver 100, an external storage medium such as a removable disk including a USB memory, a storage medium connected to a separate host, or a web server connected to the broadcast receiver 100 via a network.

The communication interface unit 130 transmits menu information. Specifically, the communication interface unit 130 may form a link to the communication interface unit 210 of the control device 200 and transmit menu information to the communication interface unit 130 through bi-directional wireless communication. In addition, the communication interface unit 130 may transmit a user interface window corresponding to an operation mode of the broadcast receiver 100 according to a request from the control device 200.

In addition, the communication interface unit 130 may receive a control command of a user from the control device 200. Meanwhile, such transmission of menu information may be performed in accordance with a request from the control device 200, or may be performed without any particular request.

Herein, the bi-directional communication may include all of the existing communication technologies such as Bluetooth (BT), Radio Frequency (RF), Wireless Fidelity (Wi-Fi), High Definition Multimedia Interface—Consumer Electronic Control (HDMI-CEC), and Wireless HDMI-CEC and all of the future bi-directional wireless communication technologies.

The menu information is information to help a user select a service of a broadcast receiver and may include information regarding channel, current volume, play time, remaining play time, current time, Electronic Program Guide (EPG), an operation mode of a broadcast receiver, and a current screen displayed on a broadcast receiver.

The communication interface unit 130 may receive the menu information and the user interface window from an external server (not shown). Specifically, the communication interface unit 130 may receive the menu information and the user interface window from an external server which provides information such as EPG information or an external server of a manufacturer of 'a control device or a broadcast receiver'.

The determination unit 140 determines an apparatus in which to display a menu for controlling the broadcast receiver 100. Specifically, the determination unit 140 may receive information regarding a control mode determined by the control device 200 and determine in which apparatus to display the menu. For example, if a control mode determined by the control device 200 is a first control mode, the determination unit 140 may determine that the menu is to be displayed on the broadcast receiver 100, and if a control mode determined by the control device 200 is a second control mode, the determination unit 140 may determine that the menu is to be displayed on a control device.

The determination unit 140 may also identify a grip direction of a user with respect to the control device 200 using a photographing sensor and determine an apparatus in which to display a menu according to the identified grip direction. For example, if the identified grip direction of a user with respect to the control device is a vertical direction, the determination unit 140 may determine that a menu is to be displayed on the broadcast receiver 100, which is the first control mode, and if the identified grip direction of a user with respect to the control device is a horizontal direction, the determination unit 140 may determine that a menu is to be displayed on the control device 200, which is the second control mode.

The control unit 150 controls each component of the broadcast receiver 100. Specifically, if the determination unit 140 determines that a menu is to be displayed on the broadcast receiver 100, which is the first control mode, the control unit 150 may control the display unit 110 to display the menu on the broadcast receiver 100. Alternatively, if the determination unit 140 determines that a menu is to be displayed on the control device 200, which is the second control mode, the control unit 150 may control the display unit 110 not to display the menu on the broadcast receiver 100. Meanwhile, menu information may be transmitted to the control device 200 only when a control mode of the control device 200 is the second control mode.

In addition, the control unit 150 may control a service operation or a service state of the broadcast receiver 100 according to a received control command and provides a service accordingly. For example, if the broadcast receiver 100 receives a control command of 'TV channel up' from the control device 200, the control unit 150 may provide a command to the TV in which a TV channel is changed. If the control device 200 requests screen information displayed on the broadcast receiver 100, the control unit 150 may control the communication interface unit 130 to transmit the screen information being displayed on the display unit 110 of the broadcast receiver 100 to the control device 200. Accordingly, a user may view the same screen information displayed on the broadcast receiver 100 on the control device 200.

The control device 200 controls the broadcast receiver 100 using bi-directional wireless communication and may be embodied as a remote controller, a mobile phone, an MP3 player, a navigator, or a digital photo frame. Specifically, the control device 200 may include a communication interface unit 210, a storage unit 220, a user interface unit 230, a determination unit 240, and a control unit 250.

The communication interface unit 210 requests the broadcast receiver 100 to send menu information. Specifically, the communication interface unit 210 may form a link to perform bi-directional wireless communication with the communication interface unit 130 of the broadcast receiver 100, request menu information to be displayed on the user interface unit 230 which will be explained later through the formed link, and receive the menu information. Meanwhile, the communication interface unit 210 may request the broadcast receiver 100 to send menu information only when a control mode of the control device 200 determined by the determination unit 240 which will be explained later is in the second control mode. When menu information is requested, information regarding a control mode determined by the determination unit 240 which will be explained later may be transmitted to the broadcast receiver 100.

Such a request for menu information may be made to an external server (not shown). Specifically, the communication interface unit 210 may request a broadcast receiver 100 which is communicable with an external server (not shown)

or an external server itself to send menu information and receive the menu information accordingly.

In addition, the communication interface unit 210 may transmit a control command received from the user interface unit 230 which will be explained later to the broadcast receiver 100.

The storage unit 220 may store broadcast information received through the communication interface unit 210 and a user interface window corresponding to an operation mode of the broadcast receiver 100. The storage unit 220 may be embodied as a storage medium in the control device 200 or as an external storage medium such as a removable disk including a USB memory and a web server via a network. A plurality of user interface windows stored in the storage unit 220 may be provided from the broadcast receiver 100.

The user interface unit 230 displays a user interface window to receive a control command and receives a control command for the broadcast receiver 100. Specifically, the user interface unit 230 has a plurality of function keys through which a user may set or select various functions supported by the broadcast receiver 100 and display a plurality of user interface windows for controlling the broadcast receiver 100. The user interface unit 230 may be embodied as an apparatus which is capable of inputting and outputting data simultaneously such as a touch pad or as an apparatus which combines a key pad with a display apparatus.

In addition, the user interface unit 230 may display a user interface window according to an operation mode of the broadcast receiver 100. Specifically, if the broadcast receiver 100 is displaying a TV broadcast, the user interface unit 230 may include various modes such as a TV control mode, a VTR control mode, and a search control mode according to the operation of the broadcast receiver 100. That is, if a user watches a TV using a broadcast receiver, a user interface window customized to control the TV may be displayed on the user interface unit 230. Alternatively, if a user watches a DVD using a broadcast receiver, a user interface window customized to watch the DVD may be displayed on the interface unit 230.

In addition, the user interface unit 230 may display received menu information on a user interface window. Specifically, the user interface unit 230 may display menu information received through the communication interface unit 210 along with a user interface window according to the above-mentioned operation mode. Such a user interface window will be explained with reference to FIGS. 4 to 6.

The determination unit 240 determines a control mode of the control device 200. Specifically, the determination unit 240 may control the control unit 250 to control the user interface unit 230 to display a user interface window according to the control mode of the control device 200. The determination unit 240 may further determine a location or positioning of the menu on the user interface window according to the control mode selected by a user through the displayed user interface window. Herein, the control mode may include a first control mode where a menu having only an area for receiving a control command regarding a broadcast receiver is displayed on a user interface window (that is, a mode where the broadcast receiver displays a menu) and a second control mode where a menu showing menu information is displayed on a user interface window (that is, a mode where a control device displays a menu).

Additionally, the determination unit 240 may also identify a grip direction of a user with respect to the control device 200, or how a user holds the control device 200, using a gyro sensor and determine a control mode corresponding to the grip direction of the user. For example, if the grip direction of a user is in a vertical direction with respect to the user, or in other words if the user holds the control device 200 in a vertical direction, the determination unit 240 may determine a control mode as the first control mode in which only an area for receiving a control command regarding a broadcast receiver 100 is displayed on a user interface window. If the grip direction of a user is in a horizontal direction with respect to the user, the determination unit 240 may determine a control mode as the second control mode in which received menu information is displayed on a user interface window.

The control unit 250 controls each component of the control device 200. Specifically, if the determination unit 240 determines a control mode as the first control mode, the control unit 250 may control the user interface unit 230 to display a user interface window according to the operation mode of the broadcast receiver 100. If the determination unit 240 determines a control mode as the second control mode, the control unit 250 may control the user interface unit 230 to display received menu information along with a user interface window according to the operation mode of the broadcast receiver 100.

In addition, if a control command is input from a user through the displayed user interface window, the control unit 250 may control the communication interface unit 110 to transmit the input control command to the broadcast receiver 100.

Meanwhile, if the control device 200 is disposed in a horizontal direction with respect to a user, the control unit 250 may control the control device 200 to display a screen being displayed on the broadcast receiver 100 on a user interface. Specifically, if it is determined that the control device 200 is disposed in a horizontal direction with respect to a user, the control unit 250 may request the broadcast receiver 100 to transmit a screen currently being displayed on the broadcast receiver 100 to the control device 200 and control the user interface unit 230 to display the screen received from the broadcast receiver 100.

Therefore, the control device according to an exemplary embodiment displays a location where a menu is displayed on the menu or on the control device according to a user's preference and circumstance, thereby improving user convenience.

In the above description regarding FIG. 1, the control device 200 controls only one broadcast receiver 100, but the control device 200 may control a plurality of broadcast receivers 100.

Figure 2:
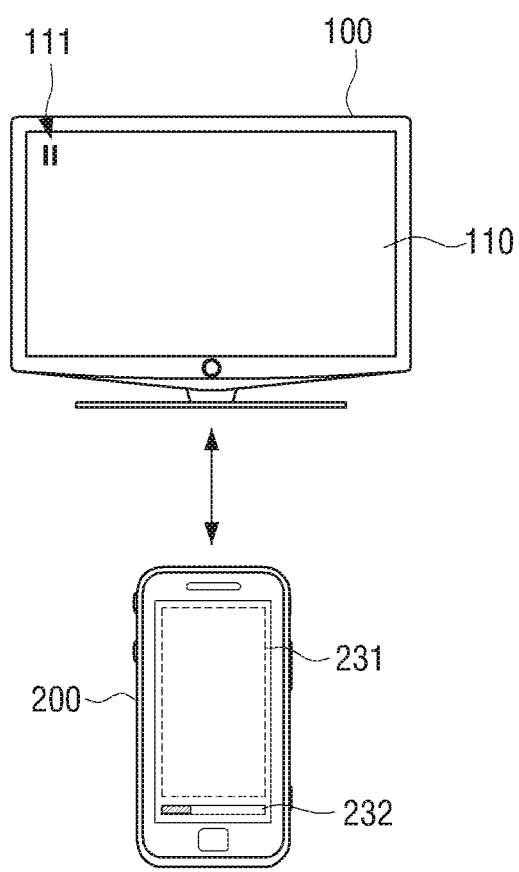
FIG. 2 is a view illustrating an example of a connection of a home network system 1000 according to an exemplary embodiment.

FIG. 2 is a view illustrating an example of connection of a home network system 1000 according to an exemplary embodiment.

Referring to FIG. 2, the home network system 1000 includes the broadcast receiver 100 and the control device 200. The broadcast receiver 100 and the control device 200 are connected by performing bi-directional communication. Accordingly, the broadcast receiver 100 may transmit menu information to the control device 200 and also receive a user's control command using bi-directional communication.

Meanwhile, the broadcast receiver 100 may display a menu 111 on the display unit 110 in accordance with a user's control command. Specifically, if the control device 200 operates in the first control mode as described above, menu information is displayed on the broadcast receiver 100.

Figure 4:
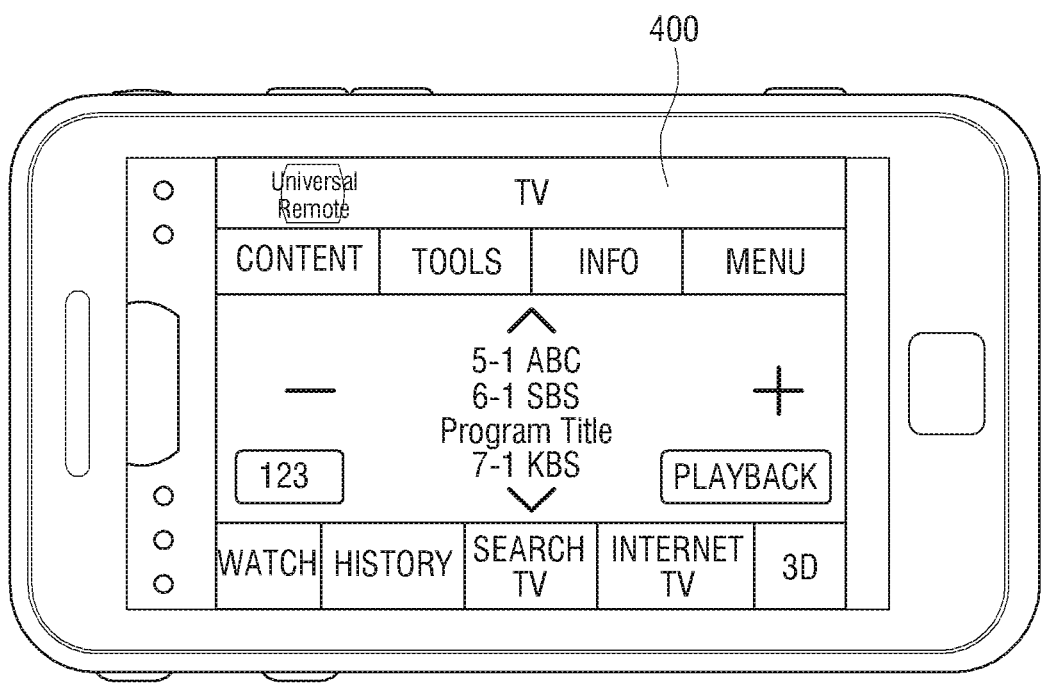
Figure 5:
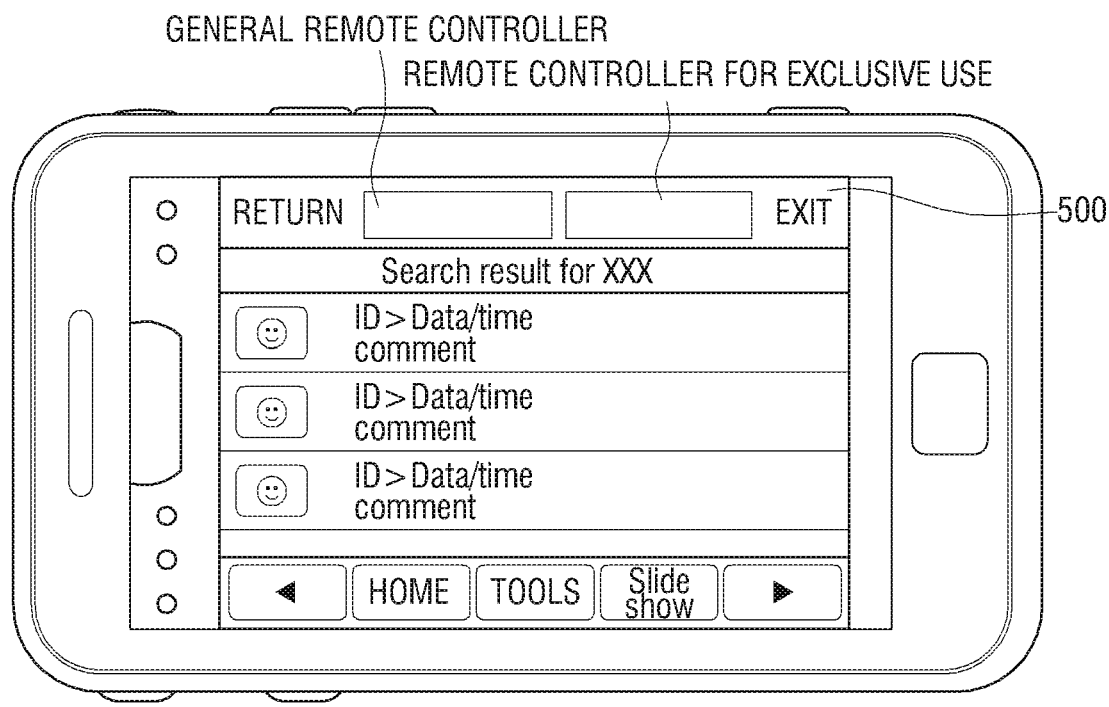

If a user changes a control mode using the area 232 for selecting a control mode of the control device 200, the control device 200 may display menu information received from the broadcast receiver 100 as illustrated in FIGS. 4 and 5. In this case, the broadcast receiver 100 may stop displaying the menu.

Specifically, the user interface unit 230 of the control device 200 may display a user interface window including a first area 231 for receiving a user's control command and a second area 232 for receiving a control mode.

The first area 231 is an area for receiving a user's control command and may display a user interface window as illustrated in FIGS. 3 to 5 according to an operation mode of the broadcast receiver 100 and a control mode of the control device 200.

The second area 232 is an area for receiving a control mode and may be displayed in the form of a slide bar as illustrated in FIG. 2.

FIGS. 3A to 3D are views illustrating examples of a user interface windows which can be displayed on a user interface unit of the control device 200 if the control device 200 is operated in the first control mode.

Figure 3A:
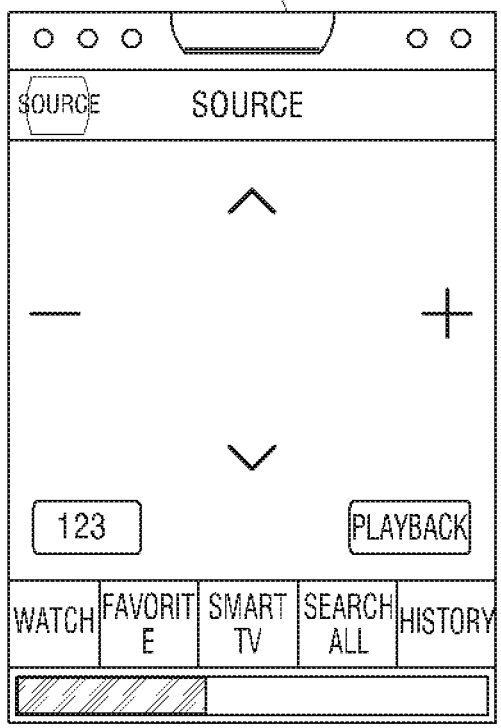
FIGS. 3A, 3B, 3C, 3D, 4, 5, and 6 are views illustrating examples of a user interface window displayed on a control device.

Referring to FIG. 3A, if the control device 200 is operated in the first control mode and the broadcast receiver 100 is operated in a TV receiving mode, the user interface window 310 of the control device 200 displays a user interface window which is optimized to control TV watching as a displayable user interface window.

Figure 3B:
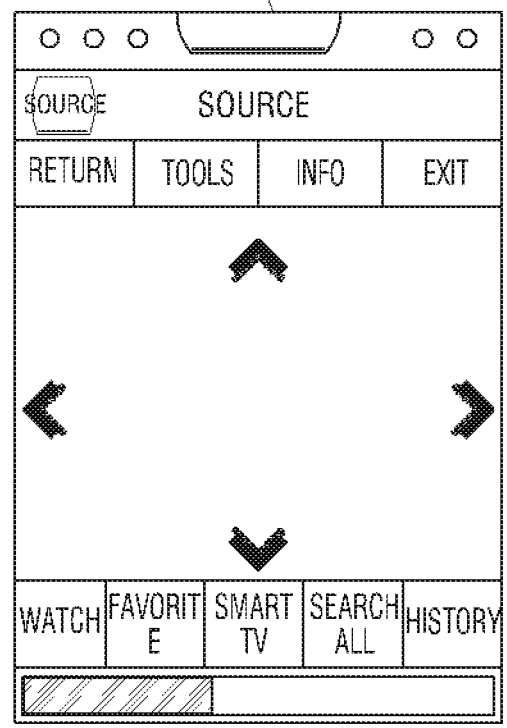

Referring to FIG. 3B, if the control device 200 is operated in the first control mode and the broadcast receiver 100 is operated in a game mode, the user interface window 320 of the control device 200 displays a user interface window which is optimized to input a control command for game operation as a displayable user interface window.

Figure 3C:
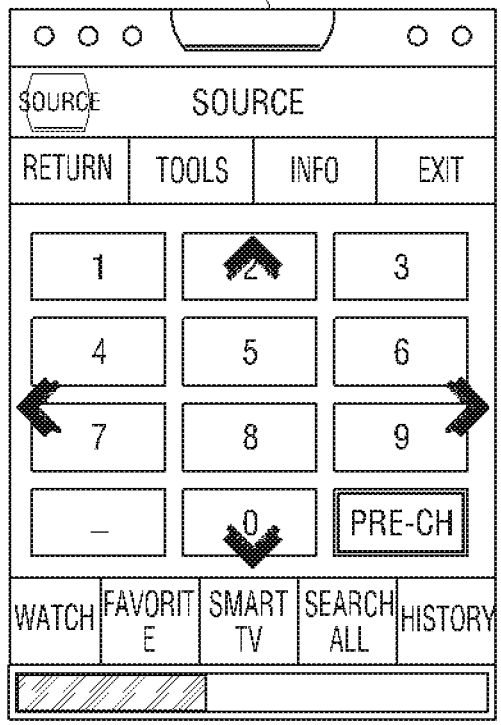

Referring to FIG. 3C, if the control device 200 is operated in the first control mode and the broadcast receiver 100 is operated in a number input mode, the user interface window 330 of the control device 200 displays a user interface window which is optimized to input a number as a displayable user interface window.

Figure 3D:
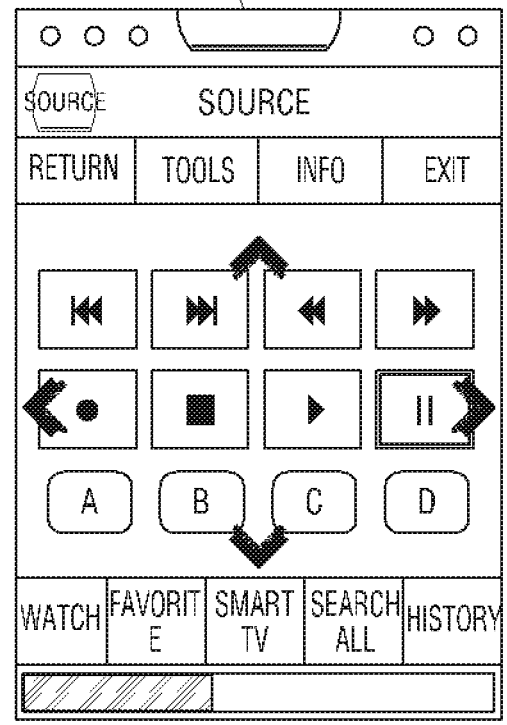

Referring to FIG. 3D, if the control device 200 is operated in the first control mode and the broadcast receiver 100 is operated in a DVD watching mode, the user interface window 340 of the control device 200 displays a user interface window which is optimized to control DVD watching as a displayable user interface window.

As such, the control device 200 according to an exemplary embodiment provides a user interface window optimized to the operation mode of the broadcast receiver 100 and thus, a user may control the broadcast receiver 100 conveniently.

FIGS. 4 and 5 are views illustrating an example of a user interface window which can be displayed on a user interface unit of the control device 200 when the control device 200 is operated in the second control mode.

Referring to FIG. 4, if the control device 200 is operated in the second control mode and the broadcast receiver 100 is operated in a TV receiving mode, the user interface window 400 displays a user interface window which is optimized to control TV watching along with menu information (information regarding a channel currently selectable by a user) as a displayable user interface window.

Thus, the user may easily identify which channel is currently displayed on the broadcast receiver 100 and to which channel the current channel may be changed through the menu information displayed on the control device 200.

Referring to FIG. 5, if the control device 200 is operated in the second control mode and the broadcast receiver 100 is operated in a search mode, the user interface window 500 displays menu information, which is, a user's search result as a displayable user interface window.

Thus, a user may check the search result through the control device 200 and input a search command and perform additional search on the control device 200 directly. Therefore, user convenience may be enhanced.

Figure 6:
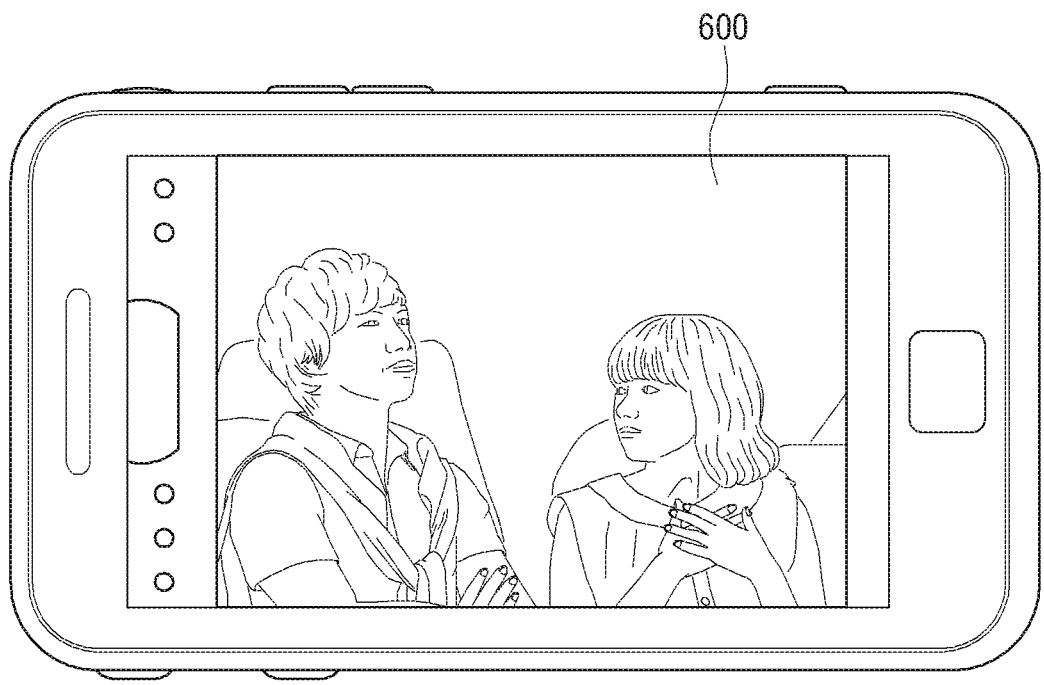

FIG. 6 is a view illustrating an example of an operation of a user interface unit when the control device 200 is gripped in a horizontal direction.

Referring to FIG. 6, if the control device 200 is disposed in a horizontal direction with respect to a user, the screen being displayed on the broadcast receiver 100 is displayed on a user interface.

As such, the screen displayed on the broadcast receiver 100 may be displayed on the control device 200 according to a grip direction of the control device 200. Thus, user convenience may be enhanced.

Figure 7:
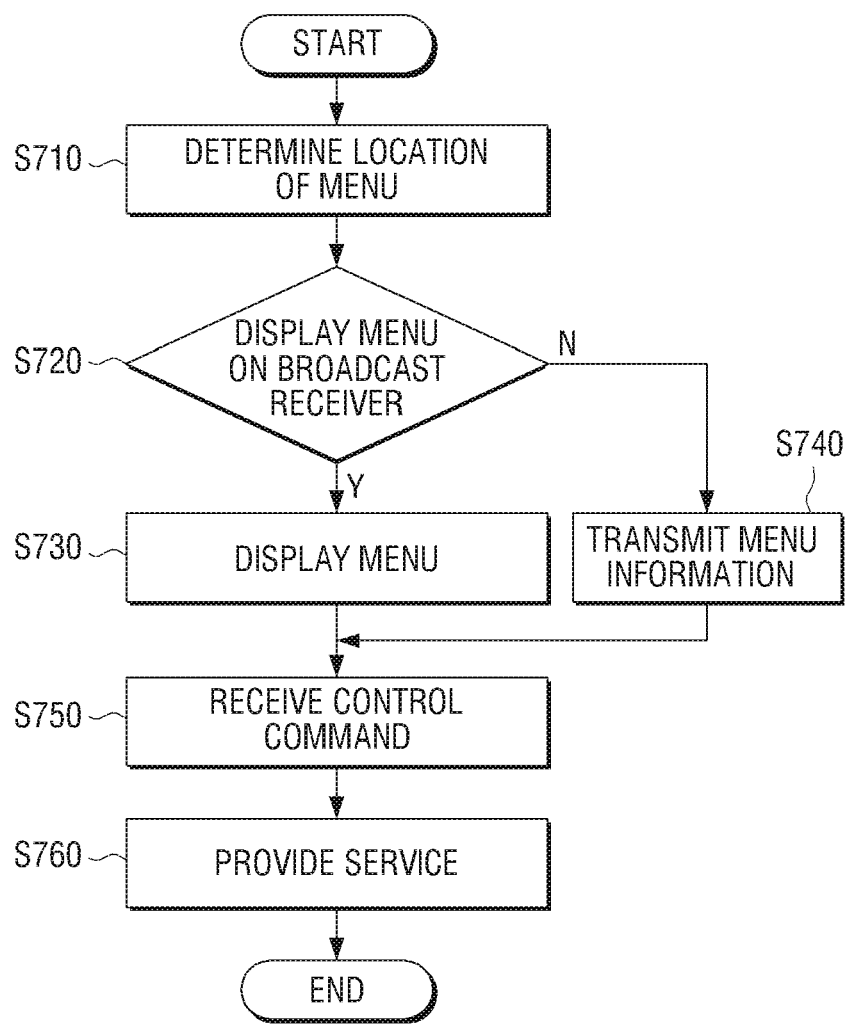
FIG. 7 is a flowchart to explain a method for providing a service according to an exemplary embodiment.

FIG. 7 is a flowchart to explain a method for providing a service according to an exemplary embodiment.

Referring to FIG. 7, first of all, an apparatus where a menu for controlling a broadcast receiver to be displayed is determined (S710); specifically, the apparatus is determined by receiving information regarding a control mode. For example, the control mode is determined by the control device 200, by identifying a grip direction of a user with respect to the control device 200 using a photographing or gyro sensor.

If it is determined that a broadcast receiver 100 is to display the menu (S720—Y), menu information is displayed (S730) on the broadcast receiver.

Alternatively, if it is determined that a control device 200 is to display the menu (S720—N), menu information is transmitted to a control device 200 (S740). Specifically, if it is determined that the menu is to be displayed on the control device 200, information which helps a user to select a desired service of a broadcast receiver 100 (such as, channel information, current volume, play time, remaining play time, current time, Electronic Program Guide (EPG), an operation mode of a broadcast receiver 100, and a current screen) is displayed on a broadcast receiver 100. Meanwhile, such transmission operation may always be provided to a control device 200 regardless of the above-mentioned control mode.

Subsequently, if a control command input from a user is received from a control device 200 (S750), a service corresponding to the received control command may be provided (S760) to the broadcast receiver 100. For example, if the broadcast receiver 100 receives a 'TV channel up' control command from the control device 200, a TV service or command to change a TV channel may be provided to the broadcast receiver 100. Meanwhile, if the received control command is a command to provide screen information, the screen information currently being displayed on the broadcast receiver 100 is transmitted to the control device 200 so that the screen being displayed on the broadcast receiver 100 is also displayed on the control device 200.

As such, the method for providing a service according to the exemplary embodiment allows a user to receive a service by controlling a broadcast receiver 100 through a remote mobile device, thereby enhancing user convenience. The method for providing a service illustrated in FIG. 7 may be performed not only in a broadcast receiver 100 having the configuration of FIG. 1 but also in a broadcast receiver 100 having other configurations.

Figure 8:
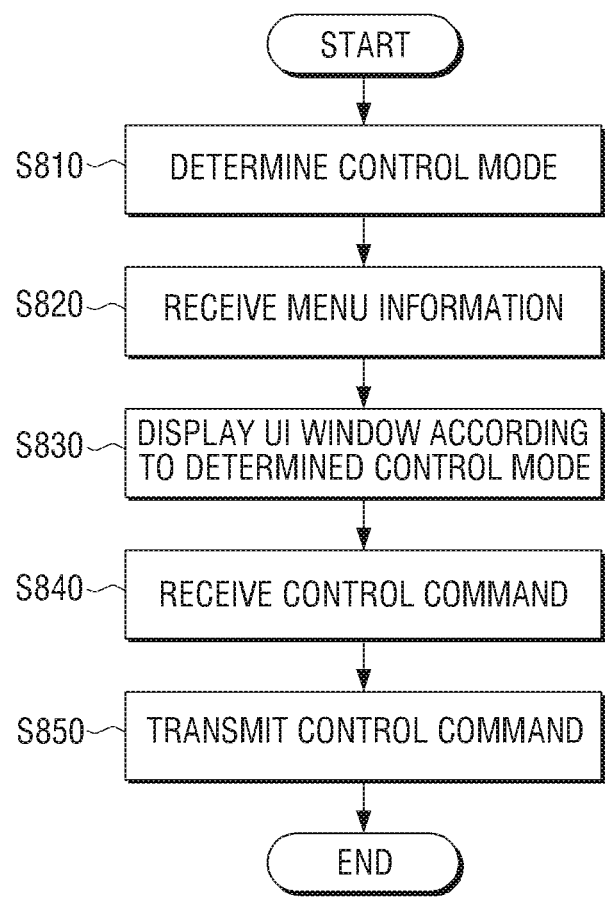
FIG. 8 is a flowchart to explain a method for controlling a broadcast receiver according to an exemplary embodiment.

FIG. 8 is a flowchart to explain a method for controlling a broadcast receiver according to another exemplary embodiment.

Referring to FIG. 8, first of all, a control mode according to an apparatus where a menu is to be displayed is determined (S810). Specifically, a user interface window for receiving at least one control mode from among a plurality of control modes is displayed and a selected control mode may be determined as a control mode of the control device 200 through the displayed user interface window. Herein, the control mode may include the first control mode in which a menu is displayed on the broadcast receiver 100 and the second control mode in which a menu is displayed on the control device 200. Meanwhile, a user's grip direction with respect to the control device 200 may be identified using a gyro sensor and the above determination may be performed according to the identified grip direction. This has been explained above with respect to the determination unit 240, so further description will not be provided.

Subsequently, menu information is requested and received from a broadcast receiver 100 (820). Specifically, menu information such as channel information, current volume, play time, remaining play time, current time, Electronic Program Guide (EPG), and an operation mode of a broadcast receiver 100 may be requested and received from a broadcast receiver 100. Such a request for menu information may be made only when a control mode is determined to be the second control mode.

The received menu information and a user interface window according to the determined control mode are displayed (S830). Specifically, if the determined control mode is the first control mode, a user interface window according to an operation mode of the broadcast receiver 100 (that is, a user interface window without menu information) is displayed, and if the determined control mode is the second control mode, menu information may also be displayed on a user interface window according to an operation mode of the broadcast receiver 100.

If a control mode regarding a broadcast receiver 100 is received using the above-mentioned user interface window from a user (S840), the input control mode is transmitted to the broadcast receiver 100 (S850).

Therefore, the method for controlling a broadcast receiver 100 according to the exemplary embodiment provides a user interface window which is optimized according to an operation mode of the broadcast receiver 100, and a user may easily select a location where a menu is to be displayed according to a user interface window or a grip method of a control device 200. The method for controlling a broadcast receiver 100 illustrated in FIG. 8 may be performed not only in a control device 200 having configuration of FIG. 1 but also in a control device 200 having other configurations.

Although a few embodiments of the exemplary embodiments have been shown and described, it would be appreciated by those skilled in the art that changes may be made to the exemplary embodiments without departing from the principles and spirit of the inventive concept, the scope of which is defined in the claims and their equivalents.

What is claimed is:

1. A method for controlling a control device, the method comprising:
   receiving, from a broadcast receiver, first information regarding a content which is currently provided through the broadcast receiver,
   identifying the content which is currently provided through the broadcast receiver based on the received first information,
   identifying a user interface (UI) corresponding to the identified content from among a plurality of UIs including a plurality of UI items for controlling the broadcast receiver, respectively,
   displaying the identified UI for controlling the identified content, and
   transmitting a control command to the broadcast receiver in response to a user input selecting an UI item from among the plurality of UI items displayed on a first UI or a second UI,
   wherein identifying the UI further comprises:
      based on identifying that the content is a broadcast content provided by the broadcast receiver, identifying, as the UI corresponding to the content, the first UI for controlling the broadcast content, and
      based on identifying that the content is an external content provided by an external device connected to the broadcast receiver, identifying, as the UI corresponding to the content, the second UI that is different from the first UI for controlling the external content.

2. The method of claim 1, further comprising:
   receiving second information from the broadcast receiver, the second information regarding a menu for a user selection of contents which can be provided through the broadcast receiver, and
   displaying the menu on the UI based on the second information.

3. The method of claim 2, further comprising: transmitting, to the broadcast receiver, third information indicating that the menu is being displayed on the control device so that the broadcast receiver does not display the menu.

4. The method of claim 1, further comprising:
   identifying whether the control device is in a vertical mode or a horizontal mode based on an orientation sensed by a sensor of the control device, and
   displaying the UI in response to identifying that the control device is in the vertical mode.

5. The method of claim 4, further comprising:
   receiving the content from the broadcast receiver, and
   displaying the content in response to identifying that the control device is in the horizontal mode.

6. The method of claim 1, wherein, in response to the control command being transmitted to the broadcast receiver according to the user input through the second UI, the control command is transmitted to the external device by the broadcast receiver.

7. The method of claim 1, wherein the first UI includes first UI items for changing a channel of the broadcast receiver and changing a volume of the broadcast receiver.

8. The method of claim 1, wherein the second UI includes second UI items for four directional keys, respectively, for controlling the external content.

9. The method of claim 1, wherein the plurality of UIs are stored in a storage unit of the control device.

10. A control device for controlling a broadcast receiver, the control device comprising:
    a display;
    a communication interface; and
    a processor configured to:
    receive, via the communication interface, first information from the broadcast receiver, the first information regarding a content which is currently provided through the broadcast receiver,
    identify the content which is currently provided through the broadcast receiver based on the received first information, identify a user interface (UI) corresponding to the identified content among a plurality of UIs including a plurality of UI items for controlling the broadcast receiver, respectively, display the identified UI for controlling the identified content, and control the communication interface to transmit a control command to the broadcast receiver in response to a user input selecting an UI item from among the plurality of UI items displayed on a first UI or a second, wherein the processor is further configured to:

based on identifying that the content is a broadcast content provided by the broadcast receiver, identify, as the UI corresponding to the content, the first UI for controlling the broadcast content, and based on identifying that the content is an external content provided by an external device connected to the broadcast receiver, identify, as the UI corresponding to the content, the second UI that is different from the first UI for controlling the external content.

11. The control device of claim 10, wherein the processor is further configured to:

receive, via the communication interface, second information from the broadcast receiver, the second information regarding a menu for a user selection of contents which can be provided through the broadcast receiver, and control the display to display the menu on the UI based on the second information.

12. The control device of claim 11, wherein the processor is further configured to control the communication interface to transmit, to the broadcast receiver, third information indicating that the menu is being displayed on the display of the control device so that the broadcast receiver does not display the menu on a display of the broadcast receiver.

13. The control device of claim 10, wherein the control device further comprises a sensor configured to sense an orientation of the control device being held by a user, and wherein the processor is further configured to:

identify whether the control device is in a vertical mode or a horizontal mode based on the orientation sensed by the sensor, and control the display to display the UI in response to identifying that the control device is in the vertical mode.

14. The control device of claim 13, wherein the processor is further configured to:

receive, via the communication interface, the content from the broadcast receiver, and control the display to display the content in response to identifying that the control device is in the horizontal mode.

15. A non-transitory computer-readable medium having recorded thereon a program for executing a controlling method of a control device, the method comprising:

receiving, from a broadcast receiver, first information regarding a content which is currently provided through the broadcast receiver, identifying the content which is currently provided through the broadcast receiver based on the received first information, identifying a user interface (UI) corresponding to the identified content from among a plurality of UIs including a plurality of UI items for controlling the broadcast receiver, respectively, displaying the identified UI for controlling the identified content, and transmitting a control command to the broadcast receiver in response to a user input selecting an UI item from among the plurality of UI items displayed on a first UI or a second UI, wherein identifying the UI further comprises:

based on identifying that the content is a broadcast content provided by the broadcast receiver, identifying, as the UI corresponding to the content, the first UI for controlling the broadcast content, and based on identifying that the content is an external content provided by an external device connected to the broadcast receiver, identifying, as the UI corresponding to the content, the second UI that is different from the first UI for controlling the external content.

* * * * *